(12) United States Patent
Tsutsumi et al.

(10) Patent No.: US 11,174,010 B2
(45) Date of Patent: Nov. 16, 2021

(54) FLYING DEVICE

(71) Applicant: Panasonic Intellectual Property Management Co., Ltd., Osaka (JP)

(72) Inventors: Shinichi Tsutsumi, Kyoto (JP); Yuichi Yoshikawa, Osaka (JP); Sho Koyama, Hyogo (JP); Keiichiro Nukada, Nara (JP); Hiroshi Ueda, Kyoto (JP); Yuki Nakade, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 402 days.

(21) Appl. No.: 16/341,941

(22) PCT Filed: Oct. 13, 2017

(86) PCT No.: PCT/JP2017/037102
§ 371 (c)(1),
(2) Date: Apr. 15, 2019

(87) PCT Pub. No.: WO2018/079290
PCT Pub. Date: May 3, 2018

(65) Prior Publication Data
US 2019/0241259 A1 Aug. 8, 2019

(30) Foreign Application Priority Data
Oct. 24, 2016 (JP) .............................. JP2016-207449

(51) Int. Cl.
*B64C 27/08* (2006.01)
*B64C 39/02* (2006.01)
(Continued)

(52) U.S. Cl.
CPC .............. *B64C 27/08* (2013.01); *B64C 39/02* (2013.01); *B64D 27/24* (2013.01); *H02K 1/02* (2013.01);
(Continued)

(58) Field of Classification Search
CPC ........ B64C 2201/027; B64C 2201/042; B64C 2201/108; B64C 27/08; B64C 39/02;
(Continued)

(56) References Cited

U.S. PATENT DOCUMENTS 6,457,654 B1* 10/2002 Glezer ..................... F15D 1/12
239/4
8,464,511 B1* 6/2013 Ribarov ................... H02K 7/14
60/226.1
(Continued)

FOREIGN PATENT DOCUMENTS

CN 101378216 A 3/2009
CN 104188348 A 12/2014
(Continued)

OTHER PUBLICATIONS

International Search Report of PCT application No. PCT/JP2017/037102 dated Jan. 16, 2018.
(Continued)

*Primary Examiner* — Medhat Badawi
(74) *Attorney, Agent, or Firm* — McDermott Will & Emery LLP (57) ABSTRACT

A flying device includes a plurality of rotary vanes, a motor element serving as a driving source for each of the plurality of rotary vanes, the motor element driving and rotating a main shaft of the rotary vanes, and a drive circuit. The motor element includes a stator, a rotor, and a pair of bearings. The stator includes a stator core having an annular yoke and a plurality of teeth projecting inward from the annular yoke,
(Continued)

and stator windings wound respectively around the plurality of teeth of the stator core. The rotor includes a permanent magnet of a cylindrical shape located inside the stator core via a gap, the permanent magnet being positioned counter to the plurality of teeth, a rotor yoke in contact with a cylindrical inner wall surface of the permanent magnet, and a shaft pivotally supported at an axis of the rotor yoke, the shaft being connected to the main shaft. The pair of bearings pivotally support the shaft to allow the shaft to rotate freely, and are located respectively on both sides of a direction of a rotating shaft of the rotor. The permanent magnet has anisotropically arranged magnetic poles, and a number of the magnetic poles is P representing an even number. The permanent magnet is configured such that the rotor yoke is smaller in weight than the permanent magnet. The drive circuit controls a stator current supplied to the stator windings.

18 Claims, 3 Drawing Sheets

(51) Int. Cl.
- B64D 27/24 (2006.01)
- H02K 1/27 (2006.01)
- H02K 1/22 (2006.01)
- H02K 1/02 (2006.01)
- H01F 1/057 (2006.01)

(52) U.S. Cl.
CPC ............... H02K 1/22 (2013.01); H02K 1/27 (2013.01); H02K 1/278 (2013.01); B64C 2201/027 (2013.01); B64C 2201/042 (2013.01); B64C 2201/108 (2013.01); H01F 1/0577 (2013.01); Y02T 50/40 (2013.01); Y02T 50/60 (2013.01)

(58) Field of Classification Search
CPC ....... B64C 39/024; H01F 1/0577; H02K 1/02; H02K 1/22; H02K 1/27; H02K 1/278; Y02T 50/40; Y02T 50/60
See application file for complete search history.

(56) References Cited

U.S. PATENT DOCUMENTS

| | | | | |
|---|---|---|---|---|
| 2007/0290577 A1* | 12/2007 | Pelrine | ............... | H01L 41/0986 310/333 |
| 2008/0122302 A1* | 5/2008 | Leininger | ............... | B25F 5/021 310/50 |
| 2009/0317233 A1* | 12/2009 | Carter | ................... | F04B 19/006 415/83 |
| 2013/0033204 A1* | 2/2013 | Maalioune | .............. | F02K 1/763 318/376 |
| 2013/0076195 A1* | 3/2013 | Li | ............................ | H02K 1/16 310/216.097 |
| 2013/0251525 A1* | 9/2013 | Saiz | ........................ | B64C 39/06 416/23 |
| 2014/0009031 A1* | 1/2014 | Li | .......................... | H02K 1/146 310/216.136 |
| 2014/0158816 A1* | 6/2014 | DeLorean | ............... | B64C 27/32 244/12.4 |
| 2014/0286745 A1* | 9/2014 | Rusovici | ............... | F01D 17/162 415/1 |
| 2014/0300235 A1* | 10/2014 | Yoshikawa | ............ | H02K 21/16 310/156.48 |
| 2014/0354100 A1* | 12/2014 | Furuta | ...................... | H02K 1/27 310/156.01 |
| 2015/0013306 A1* | 1/2015 | Shelley | ..................... | F02K 5/00 60/224 |
| 2015/0129711 A1* | 5/2015 | Caubel | ................... | A63H 27/12 244/17.23 |
| 2015/0330367 A1* | 11/2015 | Homsy | ..................... | F03D 1/02 416/244 A |
| 2016/0010589 A1* | 1/2016 | Rolt | ...................... | F01D 13/003 60/226.1 |
| 2016/0023773 A1* | 1/2016 | Himmelmann | ....... | H02M 5/458 60/778 |
| 2016/0285326 A1* | 9/2016 | Kawamura | ............ | H02K 15/03 |
| 2017/0201166 A1* | 7/2017 | Ogawa | ................... | H02K 7/083 |
| 2020/0044503 A1* | 2/2020 | Yoshikawa | ............ | H02K 21/16 |
| 2020/0235625 A1* | 7/2020 | Hishida | .................... | H02K 1/20 |
| 2020/0235628 A1* | 7/2020 | Kato | ........................ | H02K 3/12 |

FOREIGN PATENT DOCUMENTS

| | | |
|---|---|---|
| CN | 104743104 A | 7/2015 |
| JP | 2002-369474 | 12/2002 |
| JP | 2007-135332 | 5/2007 |
| JP | 2007-228762 | 9/2007 |
| JP | 2009-022096 | 1/2009 |
| JP | 2015-110413 | 6/2015 |

OTHER PUBLICATIONS

English Translation of Chinese Search Report dated Jun. 29, 2020 for the related Chinese Patent Application No. 201780065099.5.

* cited by examiner

FLYING DEVICE

TECHNICAL FIELD

The present invention relates to a flying device having a motor element serving as a driving source for rotary vanes.

BACKGROUND ART

Remote-controlled small flying devices that are used as toys or industrial devices are known. A large number of specific examples of such flying devices have been around for years since 1980s. Between such a small flying device and a remote control device that remote-controls the flying device, control information is transmitted through wired communication or wireless communication using radio waves or light. An internal-combustion engine light in weight is used as a driving source for rotary vanes of the small flying device. The small flying device has small lift, and is therefore not intended for carrying a person or transporting a heavy object, such as a freight, by air but is used as a remoted-controlled, small unmanned aircraft.

In recent years, miniaturization and performance improvement of secondary batteries have led to development of a technology that allows a motor element to be adopted as the driving source for the rotary vanes of the small flying device. As such a motor element, an inner-rotor-type motor of a closed structure or an outer-rotor-type motor of a non-closed structure is used. The inner-rotor-type motor of the closed structure tends to be heavier in weight than the outer-rotor-type motor of the non-closed structure. The outer-rotor-type motor of the non-closed structure, on the other hand, is inferior to the inner-rotor-type motor of the closed structure in dust-proofness that prevents deposition of foreign matter, such as dust.

In this manner, the inner-rotor-type motor of the closed structure and the outer-rotor-type motor of the non-closed structure have their respective advantages and disadvantages. Which of the inner-rotor-type motor of the closed structure and the outer-rotor-type motor of the non-closed structure should be chosen is decided in many cases by giving priority to flight performance of the flying device, which is improved by reducing its weight, over to dust-proofness. In many cases, the outer-rotor-type motor of the non-closed structure is adopted as the driving source for the rotary vanes of the small flying device. For example, using the outer-rotor-type motor of the non-closed structure as the driving source for the rotary vanes of the small flying device is clearly stated in PTL 1, product reference file on the small flying device, or the like.

When the flying device having the motor element serving as the driving source for the rotary vanes is used in the agricultural field, the flying device has problems caused by a scattered mist of a chemical, such as an agricultural chemical, entering the motor element and depositing there or flying or floating dust or the like entering the motor element. When the small flying device is used in a coastal area or an area in which the flying device sprays a snow melting agent, the flying device has problems caused by salty substances, such as salt water drops, sea salt, or calcium chloride, entering the motor element and depositing there.

In other words, compared to the inner-rotor-type motor of the closed structure, the outer-rotor-type motor of the non-closed structure raises a concern that it may have problems caused by a chemical, salt, dust, or the like entering the motor element. Such problems original to the outer-rotor-type motor can be eliminated by maintenance work, such as replacing the motor with a new one. This approach is, however, economically disadvantageous.

It is therefore concluded that the inner-rotor-type motor of the closed structure superior in dust-proofness to prevent problems caused by a chemical, salt, dust, or the like entering the motor element is preferable as the motor element of the small flying device.

However, a material making up a rotor and a stator of the inner-rotor-type motor includes an extremely heavy material with a specific gravity of 7 or larger. This prevents a reduction in the total weight of the flying device. For example, in a structure of an ordinary surface-magnet-type rotor, a shaft and a rotor core are made respectively of an iron alloy and electromagnetic steel plates both of which have a specific gravity of about 7.65. The rotor core is formed of a laminate of electromagnetic steel plates and has a cylindrical magnet disposed on an outermost periphery of the rotor core. In a structure of an inner-magnet-type rotor, a shaft and a rotor core are made respectively of an iron alloy and electromagnetic steel plates both of which have a specific gravity of about 7.65. The electromagnetic steel plates have a hole in which a permanent magnet with a specific gravity of about 7.55 is fitted.

In this manner, using electromagnetic steel plates with a large specific gravity is essential to the inner-rotor-type motor configured to include the surface-magnet-type rotor or the inner-magnet-type rotor because such electromagnetic steel plates are needed to create a magnetic circuit in the rotor. This fact leads to a strong tendency of an increase in the weight of the inner-rotor-type motor. The fact also becomes an obstacle to a reduction in the total weight of the flying device.

CITATION LIST

Patent Literature

PTL 1: Unexamined Japanese Patent Publication No. 2015-110413

SUMMARY OF THE INVENTION

An object of the present invention is to provide an inner-rotor-type motor element that can be reduced in weight to be a motor element suitable for a small flying device and that has a closed structure, in order to meet a demand for further improving performance of the small flying device.

To solve the above problems, the inventors of the present invention have made a series of trials and errors in diligent quest for solutions. These efforts have allowed the inventors to succeed in acquiring knowledge for providing a motor element suitable for the flying device. According to the knowledge, in the inner-rotor-type motor element of the closed structure, the rotor is provided with a permanent magnet of a cylindrical shape. The permanent magnet is magnetized in a state of polar anisotropy. Further, a rotor yoke disposed between a shaft and the permanent magnet is configured to be reduced in weight. The details of this configuration will hereinafter be described.

A flying device according to the present invention includes a plurality of rotary vanes, a motor element serving as a driving source for each of the plurality of rotary vanes, the motor element driving and rotating a main shaft of the rotary vanes, and a drive circuit. The motor element includes a stator, a rotor, and a pair of bearings. The stator includes a stator core having an annular yoke and a plurality of teeth on an interior of the annular yoke, and stator windings wound respectively around the plurality of teeth of the stator core. The rotor includes a permanent magnet of a cylindrical shape located inside the stator core via a gap, the permanent magnet being positioned counter to the plurality of teeth, a rotor yoke in contact with a cylindrical inner wall surface of the permanent magnet, and a shaft pivotally supported at an axis of the rotor yoke, the shaft being connected to the main shaft. The pair of bearings pivotally support the shaft to allow the shaft to rotate freely, and are located respectively on both sides of a direction of a rotating shaft of the rotor. The permanent magnet has anisotropically arranged magnetic poles, and a number of magnetic poles is P representing an even number. The permanent magnet is configured such that the rotor yoke is smaller in weight than the permanent magnet. The drive circuit controls a stator current supplied to the stator windings.

As described above, the present invention provides a flying device equipped with an inner-rotor-type motor element superior in dust-proofness and reduced in weight, thus offering a great industrial value.

DESCRIPTION OF EMBODIMENT

An exemplary embodiment of the present invention will hereinafter be described with reference to the drawings. As an example of this exemplary embodiment, a flying device equipped with an inner-rotor-type motor element superior in dust-proofness and reduced in weight will be described. The present invention is not limited by the exemplary embodiment to be described below.

Exemplary Embodiment

Figure 1:
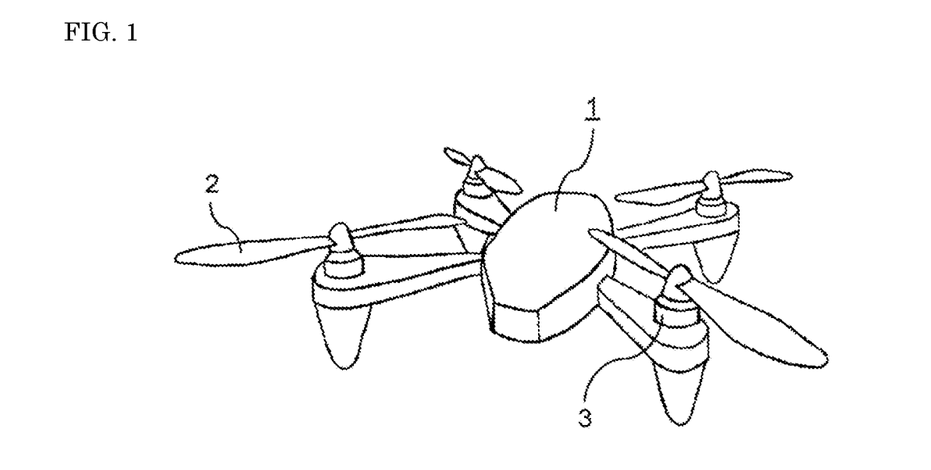
FIG. 1 is an external view of a flying device according to an exemplary embodiment of the present invention.

FIG. 1 is an external view of flying device 1 according to an exemplary embodiment of the present invention. Flying device 1 includes motor element 3 serving as a driving source for each of a plurality of rotary vanes 2, and a drive circuit that controls a stator current supplied to stator windings. Flying device 1 further includes a power supply, a control information communication unit, and a load carrying unit. For example, the power supply supplies power to the drive circuit. A secondary battery or a primary battery is used as the power supply.

Figure 2:
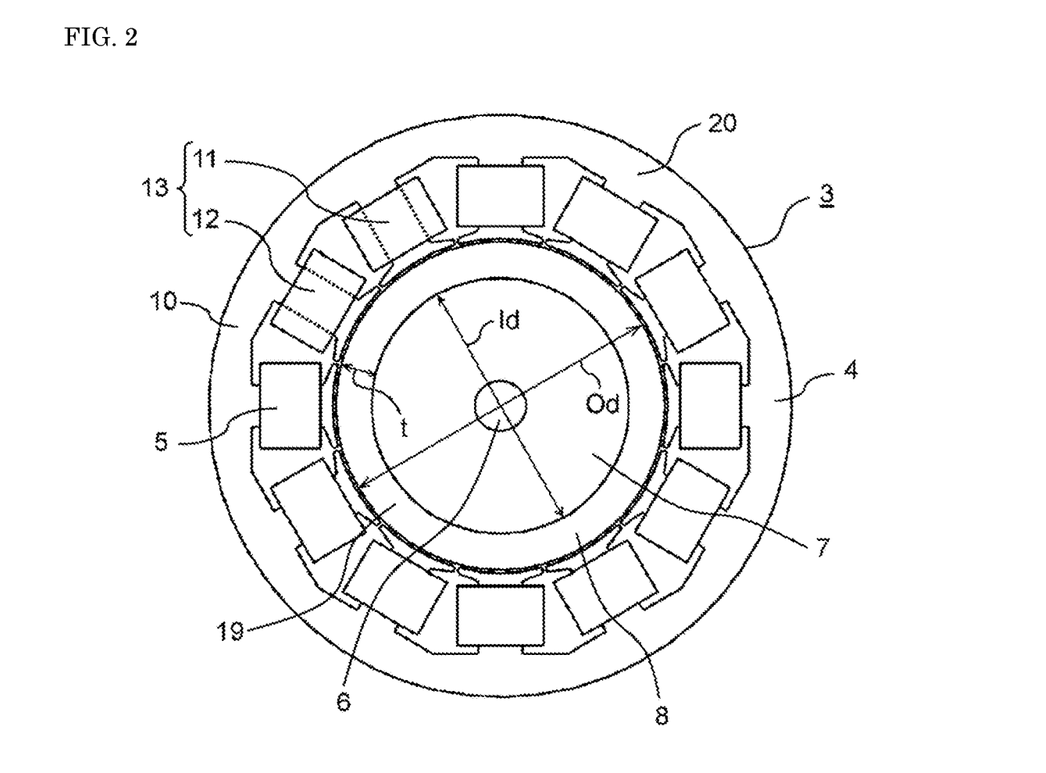
FIG. 2 depicts a motor element included in the flying device according to the exemplary embodiment of the present invention.
Figure 3:
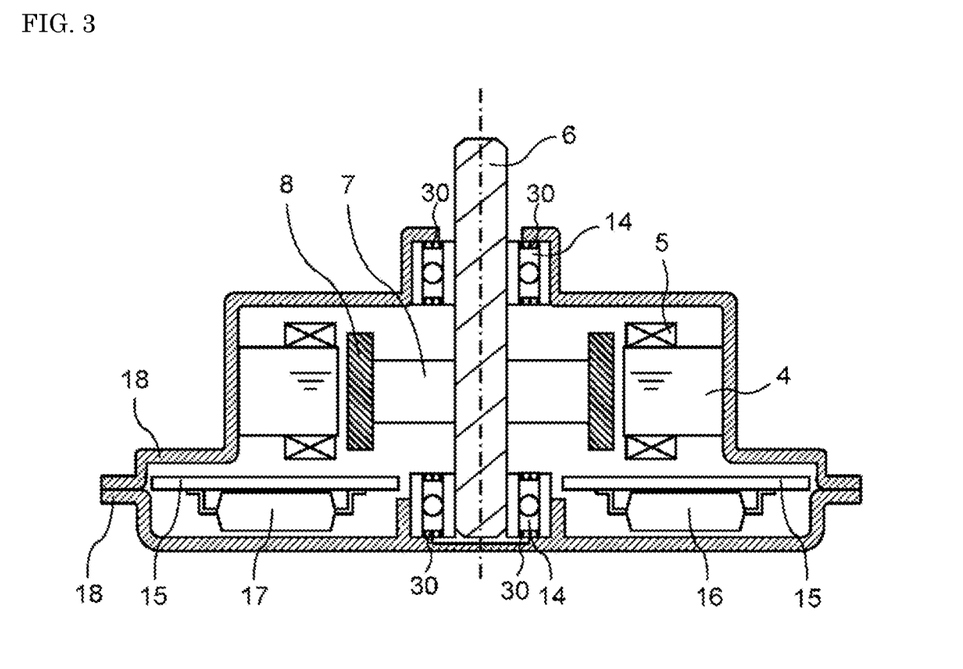
FIG. 3 is a sectional view of the motor element included in the flying device according to the exemplary embodiment of the present invention.

FIG. 2 depicts motor element 3 included in flying device 1 according to the exemplary embodiment of the present invention. FIG. 3 is a sectional view of the motor element included in flying device 1 according to the exemplary embodiment of the present invention. Specifically, FIG. 2 is a plan view that provides a bird's-eye view of motor element 3 seen in a direction of a virtual extension line of an axis extending along a center line of shaft 6 of motor element 3. As shown in FIGS. 2 and 3, motor element 3 includes stator 10, rotor 19, a pair of bearings 14, and motor element armor 18. Stator 10 includes stator core 4 and stator windings 5. Stator core 4 includes annular yoke 20 and teeth 13. Teeth 13 is made up of a group of teeth each of which is a tooth 11 and a group of teeth each of which is tooth 12. Rotor 19 includes shaft 6, rotor yoke 7, and permanent magnet 8. A gap formed between rotor 19 and stator 10 in a radial direction has a size ranging from 0.1 mm to 2 mm A proper size of the gap is selected according to specifications of the motor element. Permanent magnet 8 shown in FIG. 2 has magnetic poles, and a number of magnetic poles P is 10. Drive circuit 15, drive element 16, and control element 17 are used in a circuit of the motor element, which will be described later.

(Permanent Magnet)

Figure 4:
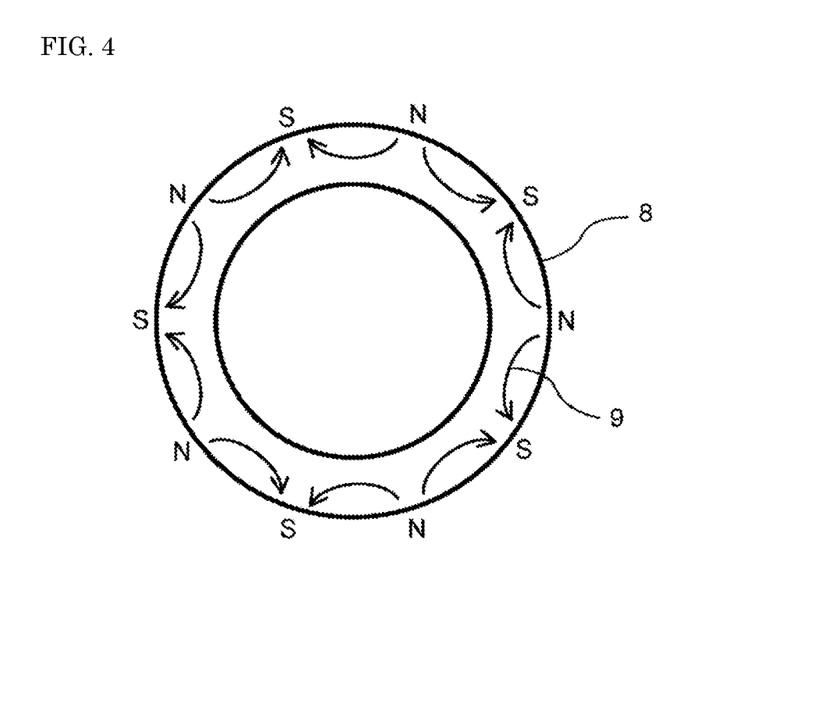
FIG. 4 is a plan view of a permanent magnet of the motor element according to the exemplary embodiment of the present invention.

Permanent magnet 8 will be described specifically. FIG. 4 is a plan view of permanent magnet 8 of motor element 3 according to the exemplary embodiment of the present invention. Permanent magnet 8 is of a cylindrical shape. Permanent magnet 8 is magnetized in a state of polar anisotropy such that S-poles and N-poles are arranged alternately on a peripheral surface of permanent magnet 8 along its circumferential direction. Arrows 9 each diagrammatically represent magnet flux between an S-pole and an N-pole. A thickness t of the cylindrical shape of the magnet can be calculated by equation (1).

$$t \approx Od \times (\pi/(2 \times (P+\pi))) \quad (1)$$

A process of deriving equation (1) will hereinafter be described.

Od denotes an outer diameter of permanent magnet 8 of the cylindrical shape. t denotes the thickness of permanent magnet 8 of the cylindrical shape in its radial direction. P denotes the number of magnetic poles that are created when permanent magnet 8 of the cylindrical shape is magnetized in the state of polar anisotropy, representing an even number. It is preferable that permanent magnet 8 of the cylindrical shape magnetized in the state of polar anisotropy satisfy equation (2). A value for t determined by equation (1) is not an accurately calculated value but is an approximation because, as it will be described later, a simpler method of calculation is intended.

$$(Od-Id)/2 \approx \pi \times Id/(2 \times P) \quad (2)$$

Id denotes an inner diameter of permanent magnet 8 of the cylindrical shape. (Od−Id)/2 in equation (2) represents the thickness t of the cylindrical shape of the magnet. (π×Id)/(2×P) in equation (2) represents a length given by dividing a length of an inner circumference with inner diameter Id of permanent magnet 8 of the cylindrical shape by a number two times the number of magnetic poles P. Equation (2) interpreted from another viewpoint will be described below. The permanent magnet magnetized in the state of polar anisotropy is modeled on the assumption that a primary part where magnet flux between magnetic poles is distributed in an arc pattern ranges from an outline of permanent magnet 8 of the cylindrical shape to the length given by dividing the length of the inner circumference with inner diameter Id of permanent magnet 8 of the cylindrical shape by the number two times the number of magnetic poles P. Based on this model, the thickness t of the cylindrical shape of the magnet is determined.

However, the permanent magnet may be modeled also on the assumption that the primary part where magnet flux between magnetic poles is distributed in the arc pattern ranges from the outline of permanent magnet 8 of the cylindrical shape to a length given by dividing a length of an outer circumference with outer diameter Od of permanent magnet 8 of the cylindrical shape by the number two times the number of magnetic poles P. Replacing Id on the right side of equation (2) with Od yields equation (3). Equation (3) indicates that the thickness of the cylindrical shape of the magnet increases, which means that a mass of the magnet of the cylindrical shape also increases.

$$(Od-Id)/2 \approx (\pi \times Id)/(2 \times P) \qquad (3)$$

A process of deriving an equation for determining the thickness t of permanent magnet 8 from equation (1) will hereinafter be described.

Equation (2) indicates that $(Od-Id)/2$ and $(\pi \times Id)/(2 \times P)$ are substantially equal to each other.

As mentioned above, t denoting the thickness of the cylindrical shape of the magnet is $(Od-Id)/2$. This is expressed by equation (4).

$$t=(Od-Id)/2 \qquad (4)$$

Equation (4) is transformed into equation (5).

$$Id=Od-(2 \times t) \qquad (5)$$

Substituting equation (5) in equation (2) gives equation (6).

$$2 \times t \approx \pi (Od-(2 \times t))/P \qquad (6)$$

Further transforming equation (6) into an equation for determining t gives equation (1).

$$(2 \times t \times P) \approx \pi \times Od-(2 \times \pi \times t)$$

$$(2 \times t \times P)+(2 \times \pi \times t) \approx (\pi \times Od) t \times ((2 \times P)+(2 \times \pi)) \approx (\pi \times Od)$$

$$t \approx (\pi \times Od)/((2 \times P)+(2 \times \pi))$$

$$t \approx Od \times (\pi/(2 \times (P+\pi))) \qquad (1)$$

When equation (3) is transformed into an equation for determining the thickness t of permanent magnet 8 by the same process of transformation as equation (2) is subjected to, equation (7) is obtained.

$$t \approx Od \times (\pi/(2 \times P)) \qquad (7)$$

Equation (1) and equation (7) differ from each other in that a multiplier of Od denoting the outer diameter of permanent magnet 8 of the cylindrical shape is $(\pi/(2 \times (P+\pi)))$ in equation (1) and is $(\pi/(2 \times P))$ in equation (7).

As indicated by equation (1), an approximation of t denoting the thickness of permanent magnet 8 of the cylindrical shape in its radial direction is calculated from Od denoting the outer diameter of permanent magnet 8 of the cylindrical shape and P denoting the number of magnetic poles that are created when permanent magnet 8 of the cylindrical shape is magnetized in the state of polar anisotropy.

[Table 1] shows values for t that are calculated by substituting 20, 30, 38.3, 40, 50, and 60 in Od in equation (1) and even numbers ranging from 4 to 36 in P in equation (1), as respective pairs of values for Od, i.e., 20, 30, 38.3, 40, 50, and 60, and values for P, i.e., even numbers ranging from 4 to 36.

In [table 1], evaluation symbols representing evaluations described below are entered in evaluation symbol columns.

In cases where a ratio of t denoting the thickness of permanent magnet 8 of the cylindrical shape in its radial direction to Od denoting the outer diameter of permanent magnet 8 of the cylindrical shape is about 15% or higher, the weight of permanent magnet 8 tends to be excessively large. These cases are considered to be configurations not contributing to a reduction in the weight of the motor element, and "◇" is entered in the evaluation symbol columns.

In cases where the ratio of t denoting the thickness of permanent magnet 8 of the cylindrical shape in its radial direction to Od denoting the outer diameter of permanent magnet 8 of the cylindrical shape is about 5% or lower, t denoting the thickness of permanent magnet 8 of the cylindrical shape in its radial direction is excessively small. These cases result in low mechanical strength of permanent magnet 8 of the cylindrical shape, posing a problem with productivity when permanent magnet 8 is mass-produced. The cases also lead to a technical problem with ensuring a proper state of polar anisotropy in magnetization as the number of magnetic poles increases. Based on this conclusion, "Δ" is entered in the evaluation symbol columns.

Cases of the number of magnetic poles in which "◇" and "Δ" are not entered in the evaluation symbol columns are considered to be configurations contributing to a reduction in the weight of the motor element, and therefore "○" is entered in the evaluation symbol columns. In cases where evaluations vary, "○ or Δ" or "○ or ◇", which represents an intermediate evaluation, is entered in the evaluation symbol columns.

Thus, in [table 1], "Δ" is entered in the evaluation symbol columns in cases where the number of magnetic poles P is 26 or more. In cases where the number of magnetic poles P is 6 or less, "□" is entered in the evaluation symbol columns. In cases where the number of magnetic poles P ranges from 10 to 22, "○" is entered in the evaluation symbol columns. In cases where the number of magnetic poles P is 8, "○ or ◇" is entered in the evaluation symbol columns. In cases where the number of magnetic poles P is 24, "○ or Δ" is entered in the evaluation symbol columns.

It should be noted that a calculated value for t shown in [table 1] is rarely selected as the value for t denoting the thickness of actually manufactured permanent magnet 8 of the cylindrical shape in its radial direction. To reflect manufacturing conditions, such as manufacturing processes, for permanent magnet 8 of the cylindrical shape, for example, an executable value given by slightly reducing or increasing a value for t determined by equation (1), the executable value ranging from 0.8×t to 1.3×t or 0.7×t to 1.5×t, is selected, A value for t determined by equation (7) may also be adopted as the value for t denoting the thickness of permanent magnet 8 of the cylindrical shape in its radial direction. In this case, to reflect manufacturing conditions, such as manufacturing processes, for permanent magnet 8 of the cylindrical shape, an executable value given by slightly reducing or increasing a value for t determined by equation (7), the executable value ranging from 0.8×t to 1.3×t or 0.7×t to 1.5×t, is selected in the same manner as in the above case.

TABLE 1

Values for thickness t (mm) of magnet of cylindrical shape magnetized
in state of polar anisotropy that are calculated by equation (1)

|  |  | Case 1 Od = 60 mm | | Case 2 Od = 50 mm | | Case 3 Od = 40 mm | | Case 4 Od = 38.3 mm | | Case 5 Od = 30 mm | | Case 6 Od = 20 mm | |
| --- | --- | --- | --- | --- | --- | --- | --- | --- | --- | --- | --- | --- | --- |
|  |  | t | Evaluation symbol | t | Evaluation symbol | t | Evaluation symbol | t | Evaluation symbol | t | Evaluation symbol | t | Evaluation symbol |
| Number of magnetic poles P of magnet of cylindrical shape magnetized in state of polar anisotropy | 4 | 13.2 | ◊ | 11.0 | ◊ | 8.8 | ◊ | 8.4 | ◊ | 6.6 | ◊ | 4.0 | ◊ |
| | 6 | 10.3 | ◊ | 8.6 | ◊ | 6.9 | ◊ | 6.6 | ◊ | 5.2 | ◊ | 3.4 | ◊ |
| | 8 | 8.5 | ○~◊ | 7.1 | ○~◊ | 5.6 | ○~◊ | 5.4 | ○~◊ | 4.2 | ○~◊ | 2.8 | ○~◊ |
| | 10 | 7.2 | ○ | 6.0 | ○ | 4.8 | ○ | 4.7 | ○ | 3.6 | ○ | 2.4 | ○ |
| | 12 | 6.2 | ○ | 5.2 | ○ | 4.1 | ○ | 4.0 | ○ | 3.1 | ○ | 2.1 | ○ |
| | 14 | 5.5 | ○ | 4.6 | ○ | 3.7 | ○ | 3.5 | ○ | 2.7 | ○ | 1.8 | ○ |
| | 16 | 4.9 | ○ | 4.1 | ○ | 3.3 | ○ | 3.1 | ○ | 2.5 | ○ | 1.6 | ○ |
| | 18 | 4.5 | ○ | 3.7 | ○ | 3.0 | ○ | 2.8 | ○ | 2.2 | ○ | 1.5 | ○ |
| | 20 | 4.1 | ○ | 3.4 | ○ | 2.7 | ○ | 2.6 | ○ | 2.0 | ○ | 1.4 | ○ |
| | 22 | 3.8 | ○ | 3.1 | ○ | 2.5 | ○ | 2.4 | ○ | 1.9 | ○ | 1.3 | ○ |
| | 24 | 3.5 | ○~Δ | 2.9 | ○~Δ | 2.3 | ○~Δ | 2.2 | ○~Δ | 1.7 | ○~Δ | 1.2 | ○~Δ |
| | 26 | 3.2 | Δ | 2.7 | Δ | 2.2 | Δ | 2.1 | Δ | 1.6 | Δ | 1.1 | Δ |
| | 28 | 3.0 | Δ | 2.5 | Δ | 2.0 | Δ | 1.9 | Δ | 1.5 | Δ | 1.0 | Δ |
| | 30 | 2.8 | Δ | 2.4 | Δ | 1.9 | Δ | 1.8 | Δ | 1.4 | Δ | 0.95 | Δ |
| | 32 | 2.7 | Δ | 2.2 | Δ | 1.8 | Δ | 1.7 | Δ | 1.3 | Δ | 0.89 | Δ |
| | 34 | 2.5 | Δ | 2.1 | Δ | 1.7 | Δ | 1.6 | Δ | 1.3 | Δ | 0.85 | Δ |
| | 36 | 2.4 | Δ | 2.0 | Δ | 1.6 | Δ | 1.5 | Δ | 1.2 | Δ | 0.8 | Δ |

[Table 2] shows results of trial calculations of respective masses of permanent magnet 8, rotor yoke 7, and rotor 19 (permanent magnet 8 and rotor yoke 7) that have been made for respective numbers of magnetic poles P in a case where Od=38.3 mm and a dimension h in the direction of the rotating shaft=10 mm. A volume of permanent magnet 8 and that of rotor yoke 7 are calculated for each of the numbers of magnetic poles. Needless to say, the product of such a volume and a density or specific gravity obviously gives mass. Detailed description in this respect will therefore be omitted. The mass is calculated on the assumption that a density of permanent magnet 8 is 7.4 g/cm$^3$. Shaft 6 axially penetrating rotor yoke 7 is 6 mm in diameter. The mass is calculated on the assumption that a specific gravity of a resin material making up rotor yoke 7 is 1.55.

In [table 2], amounts of increases/decreases of mass of the rotor are listed, with a mass of the rotor with the number of magnetic poles P=10 being defined as a reference mass. The evaluation symbol notation described above is adopted also in [table 2], in which evaluations are entered accordingly.

As indicated in [table 2], the mass of the rotor (permanent magnet 8 and rotor yoke 7) in a case of the number of magnetic poles P=10 is 46.4 g.

For comparison, for the case of the number of magnetic poles P=10, the above trial calculation is made on a surface-magnet-type rotor having a radially arranged magnet. The trial calculation calculates a mass of the surface-magnet-type rotor at about 100 g, which is about two times the mass of the rotor according to this exemplary embodiment. This difference results mainly because that while rotor yoke 7 according to this exemplary embodiment is made of a resin material, rotor yoke 7 of the surface-magnet-type rotor is made of an electromagnetic steel plate. The reason for using the electromagnetic steel plate is that, to achieve motor element characteristics (torque or the like) substantially equal to motor element characteristics achieved by the rotor according to this exemplary embodiment, a magnetic circuit composed of an electromagnetic steel plate or the like must be provided in the surface-magnet-type rotor.

For comparison, for the case of the number of magnetic poles P=10, the above trial calculation is made also on a rotor of an interior permanent magnet (IPM) motor configured such that a laminate of electromagnetic steel plates has a magnet burial hole in which a magnet is placed. The trial calculation calculates a mass of the rotor of the IPM motor at about 80 g, which is about 1.7 times the mass of the rotor according to this exemplary embodiment. This difference results mainly because that while rotor yoke 7 according to this exemplary embodiment is made of the resin material, almost the whole of the rotor of the IPM motor is made up of the electromagnetic steel plates having the magnet placed in the magnet burial hole. The reason for using the electromagnetic steel plates is that, to achieve motor element characteristics (torque or the like) substantially equal to motor element characteristics achieved by the rotor according to this exemplary embodiment, a magnetic circuit composed of electromagnetic steel plates for creating a magnet torque and a reluctance torque is needed.

It is understood from the above description that the rotor of the motor element according to this exemplary embodiment is preferable to the surface-magnet-type rotor or the rotor of the IPM motor in terms of configuration for a reduction in the weight of the flying device.

TABLE 2

Values given by trial calculations of respective masses of magnet, yoke, and rotor for case where Od = 38.3 mm and dimension h = 10 mm

| | a | b<br>Mass of magnet of cylindrical shape magnetized in state of polar anisotropy [g] | c<br>Mass of rotor yoke made of resin [g] | d<br>(b + c)<br>Mass of rotor [g] | e<br>Increase/decrease in mass with reference to mass of rotor with number of magnetic poles P = 10 [g] | f<br>Increase/decrease in mass with reference to mass of rotor with number of magnetic poles P = 11 [g] | g<br>Evaluation symbol |
|---|---|---|---|---|---|---|---|
| | t | | | | | | |
| Number of magnetic poles P of magnet of cylindrical shape magnetized in state of polar anisotropy | 4 | 8.4 | 58.4 | 3.2 | 61.6 | 142 | 19.6 | ◇ |
| | 6 | 6.6 | 48.6 | 7.7 | 56.3 | 121 | 9.9 | ◇ |
| | 8 | 5.4 | 41.3 | 9.2 | 50.5 | 109 | 4.1 | ○~◇ |
| | 10 | 4.7 | 36.7 | 9.7 | 46.4 | 0 | 0 | ○ |
| | 12 | 4.0 | 31.9 | 10.7 | 42.6 | 93 | −4.0 | ○ |
| | 14 | 3.5 | 28.3 | 11.5 | 39.8 | 86 | −7.4 | ○ |
| | 16 | 3.1 | 25.4 | 12.1 | 37.5 | 81 | −8.9 | ○ |
| | 18 | 2.8 | 23.1 | 12.6 | 35.7 | 77 | −10.7 | ○ |
| | 20 | 2.6 | 21.6 | 12.9 | 34.5 | 74 | −11.9 | ○ |
| | 22 | 2.4 | 20.0 | 13.2 | 33.2 | 72 | −13.2 | ○ |
| | 24 | 2.2 | 18.5 | 13.9 | 32.4 | 70 | −14.0 | ○~△ |
| | 26 | 2.1 | 17.7 | 13.9 | 31.6 | 68 | −14.8 | △ |
| | 28 | 1.9 | 16.3 | 14.1 | 30.4 | 66 | −16.0 | △ |
| | 30 | 1.8 | 15.3 | 14.2 | 29.5 | 64 | −16.9 | △ |
| | 32 | 1.7 | 14.5 | 14.4 | 28.9 | 62 | −17.5 | △ |
| | 34 | 1.6 | 13.7 | 14.6 | 28.3 | 61 | −18.1 | △ |
| | 36 | 1.5 | 11.6 | 14.7 | 26.3 | 57 | −20.1 | △ |

[Table 3] shows results of calculations of the mass of permanent magnet 8 of the cylindrical shape that have been made for the case of the dimension h in the direction of the rotating shaft=10 mm. In [table 3], values for Od denoting the outer diameter of permanent magnet 8 of the cylindrical shape are 60 mm, 50 mm, 40 mm, 38.3 mm, 30 mm, and 20 mm. Values for the number of magnetic poles P that are created when the permanent magnet 8 of the cylindrical shape is magnetized in the state of polar anisotropy are 4, 8, 10, 22, 24, 26, and 36. The volume of permanent magnet 8 is calculated for each of pairs of the numbers of magnetic poles and outer diameters. Needless to say, as in the case of [table 2], the mass of permanent magnet 8 of the cylindrical shape is obviously given as the product of its volume and density. Detailed description in this respect will therefore be omitted.

The mass is calculated on the assumption that the density of permanent magnet 8 is 7.4 g/cm³. Entries in the evaluation symbol columns of [table 1] are reused in [table 3]. A qualitative tendency that the mass of permanent magnet 8 of the cylindrical shape shows in [table 3] leads to understanding that the weight (mass) of the motor element increases as the outer diameter of permanent magnet 8 of the cylindrical shape increases. A method of increasing power output from the motor element is obvious. It is to increase outline dimensions of the stator and rotor of the motor element.

TABLE 3

Values given by trial calculations of mass of magnet m (g) for case where dimension h = 10, and values for thickness t (mm) magnet of cylindrical shape magnetized in state of polar anisotropy that are excerpted from table 1

| | | Case 1<br>Od = 60 mm | | Case 2<br>Od = 50 mm | | Case 3<br>Od = 40 mm | | Case 4<br>Od = 38.3 mm | | Case 5<br>Od = 30 mm | | Case 6<br>Od = 20 mm | | Remarks |
|---|---|---|---|---|---|---|---|---|---|---|---|---|---|---|
| | | t | m | t | m | t | m | t | m | t | m | t | m | Evaluation symbol |
| Number of magnetic poles P of magnet of cylindrical shape magnetized in state of polar anisotropy | 4 | 13.2 | 143.6 | 11.0 | 99.7 | 8.8 | 68.8 | 8.4 | 58.4 | 6.6 | 35.9 | 4.0 | 14.9 | ◇ |
| | 8 | 8.5 | 101.8 | 7.1 | 70.8 | 5.6 | 44.8 | 5.4 | 41.3 | 4.2 | 25.2 | 2.8 | 11.2 | ○~◇ |
| | 10 | 7.2 | 88.4 | 6.0 | 61.4 | 4.8 | 39.3 | 4.7 | 36.7 | 3.6 | 22.1 | 2.4 | 9.8 | ○ |
| | 22 | 3.8 | 49.6 | 3.1 | 33.8 | 2.5 | 21.8 | 2.4 | 20.0 | 1.9 | 12.4 | 1.3 | 5.7 | ○ |
| | 24 | 3.5 | 46.0 | 2.9 | 31.8 | 2.3 | 20.2 | 2.2 | 18.5 | 1.7 | 11.2 | 1.2 | 5.2 | ○~△ |
| | 26 | 3.2 | 42.3 | 2.7 | 29.5 | 2.2 | 17.5 | 2.1 | 17.7 | 1.6 | 10.6 | 1.1 | 4.8 | △ |
| | 36 | 2.4 | 32.1 | 2.0 | 22.3 | 1.6 | 14.3 | 1.5 | 11.6 | 1.2 | 8.0 | 0.8 | 3.6 | △ |

To increase power output from the motor element, for example, the outer diameter Od of permanent magnet 8 of the cylindrical shape is increased or the dimension h in the direction of the rotating shaft of permanent magnet 8 of the cylindrical shape is increased. Which of increasing the outer diameter Od and increasing the dimension h in the direction of the rotating shaft is more effective varies depending on specifications, and is therefore determined on a case-by-case basis. As a method of minor adjustment of power output from the motor element, adjusting the dimension h in the direction of the rotating shaft of permanent magnet 8 of the cylindrical shape is a simpler method and is adopted in many cases.

(Motor Element)

Materials of constituent elements making up motor element 3 according to this exemplary embodiment will hereinafter be described.

Stator core 4 is made of an electromagnetic steel plate referred to as 35H300. The electromagnetic steel plate contains iron (Fe) and silicon (Si) as main components, and its sub-components are not limited to specific components. The electromagnetic steel plate contains an inevitable impurity that cannot be identified. Stator winding 5 has a conductor, and a covering layer made of an insulating material covering the conductor. A material preferable as the insulating material is selected from polyurethane, polyester, polyester imide, and the like. The conductor contains copper (Cu) or aluminum (Al) as a main component and further contains a plurality of types of inevitable impurities.

Permanent magnet 8 contains, as its components, iron (Fe), boron (B), and at least one of scandium (Sc), yttrium (Y), and a lanthanoids-based element. Permanent magnet 8 may contain cobalt (Co) as its component. Permanent magnet 8 is, specifically, a rare-earth sintered magnet, and is referred to as neodymium sintered magnet. The rare-earth sintered magnet has a surface layer serving as a rust preventive film (rust preventive layer) for preventing development of rust. The rare-earth sintered magnet according to this exemplary embodiment has the density of 7.4 g/cm$^3$. However, a rare-earth sintered magnet having a density ranging from 7.3 g/cm$^3$ to 7.7 g/cm$^3$ may also be used as the rare-earth sintered magnet according to this exemplary embodiment.

As a material of rotor yoke 7, polybutylene terephthalate (PBT) resin (with a specific gravity of 1.55) containing a glass filler of 30 wt. % is used. However, a material containing one of iron (Fe), magnesium (Mg), aluminum (Al), copper (Cu), and a resin material and meeting a technical specification requirement for sufficient strength and less weight is applicable as the material of rotor yoke 7. Any material meeting this condition may be used as the material of rotor yoke 7 without specific limitation. The resin material is not limited to the above PBT resin. Any resin material meeting the technical specification requirement for sufficient strength and less weight may be used as the resin material of rotor yoke 7 without specific limitation.

Similarly, a component of the motor element armor is selected as at least one of iron (Fe), magnesium (Mg), aluminum (Al), copper (Cu), and a resin material without specific limitation. The resin material is not limited to the above PBT resin. Any resin material meeting the technical specification requirement for sufficient strength and less weight may be used as the resin material of the motor element armor without specific limitation.

Bearing 14 may have seal 30 in contact with outer and inner rings of bearing 14 in order to improve the dust-proofness and power output performance of motor element 3. Bearing 14 may be provided as a bearing having seal 30 that is in contact with the outer ring but not in contact with the inner ring and that is close to the inner ring.

Figure 5:
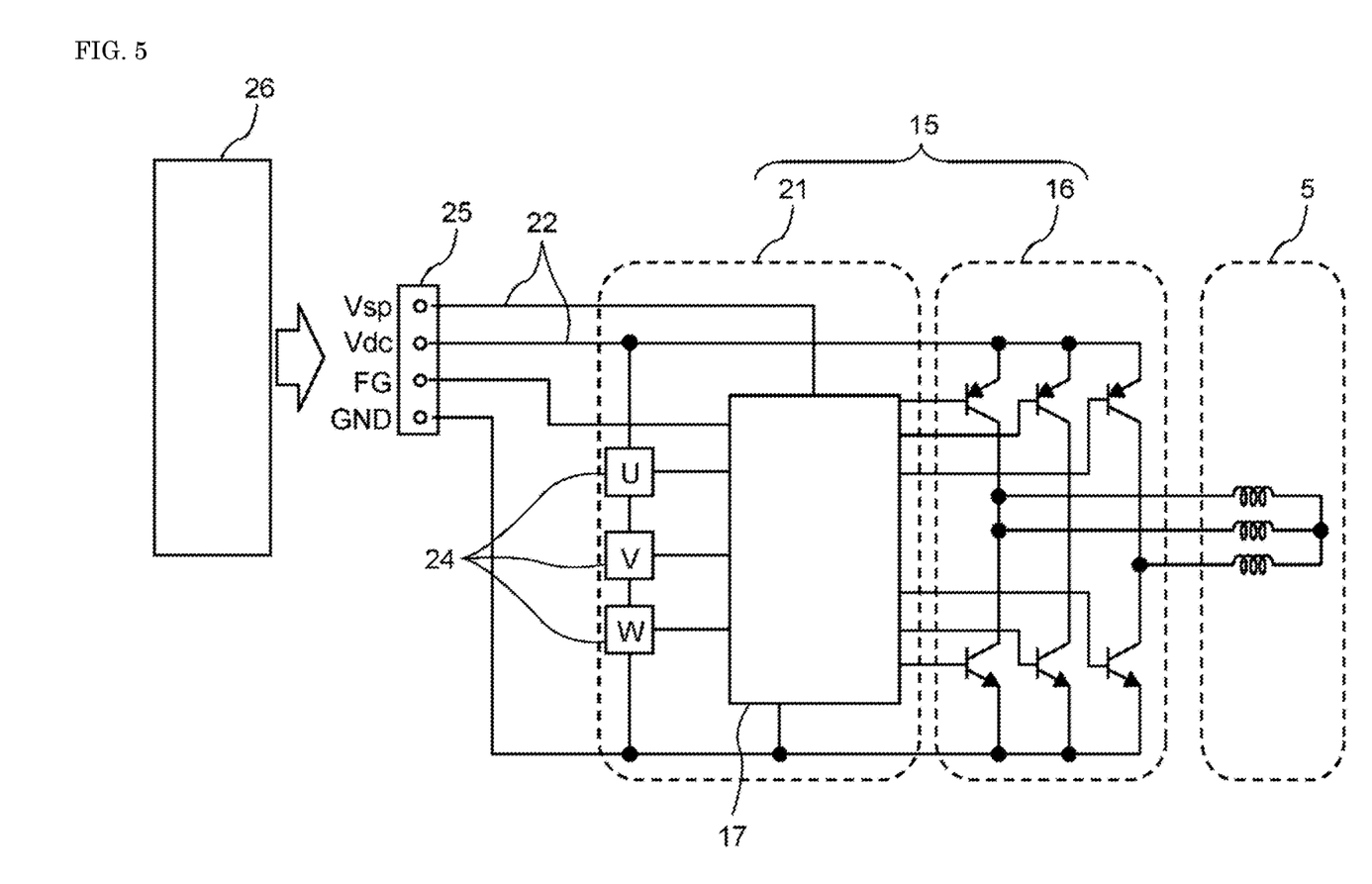
FIG. 5 is a circuit block diagram of the motor element according to the exemplary embodiment of the present invention.

FIG. 5 is a circuit block diagram of motor element 3 according to the exemplary embodiment of the present invention.

Power supplied from DC power supply 26 disposed inside a body of flying device 1 is fed to each of circuits included in motor element 3, via power connector 25.

Motor element 3 includes a plurality of lines 22 feeding supplied power. Some of lines 22 feed suppled power to stator windings 5 serving as drive coils.

The other of lines 22 feed suppled power to magnetic pole detecting element 24, control element 17, drive element 16, and controller 21 including other circuit elements.

As described above, flying device 1 according to this exemplary embodiment includes the plurality of rotary vanes 2, motor element 3 serving as the driving source for each of the plurality of rotary vanes 2, motor element 3 driving and rotating the main shaft of rotary vanes 2, and drive circuit 15. Motor element 3 includes stator 10, rotor 19, and the pair of bearings 14. Stator 10 includes stator core 4 having annular yoke 20 and the plurality of teeth 11, 12 projecting inward from annular yoke 20, and stator windings 5 wound respectively around the plurality of teeth 11, 12 of stator core 4. Rotor 19 includes permanent magnet 8 of the cylindrical shape located inside stator core 4 via a gap, permanent magnet 8 being positioned counter to the plurality of teeth 11, 12, rotor yoke 7 in contact with a cylindrical inner wall surface of permanent magnet 8, and shaft 6 pivotally supported at an axis of rotor yoke 7, shaft 6 being connected to the main shaft. The pair of bearings 14 pivotally support shaft 6 to allow it to rotate freely, and are located respectively on both sides of the direction of the rotating shaft of rotor 19. Permanent magnet 8 has anisotropically arranged magnetic poles, and the number of the magnetic poles is P representing an odd number. Permanent magnet 8 is configured such that rotor yoke 7 is smaller in weight than permanent magnet 8. Drive circuit 15 controls a stator current supplied to stator windings 5.

Thus, a flying device equipped with an inner-rotor-type motor element superior in dust-proofness and reduced in weight can be provided.

A ferromagnetic material included in permanent magnet 8 may contain iron (Fe), boron (B), and at least one of scandium (Sc), yttrium (Y), and lanthanoids-based element.

It is preferable that permanent magnet 8 include a ferromagnetic material with a density not lower than 7.4 g/cm$^3$.

It is preferable that when the outer diameter of permanent magnet 8 is Od, the thickness of permanent magnet 8 in its radial direction, the thickness being given by subtracting a half of the outer diameter of permanent magnet 8 from a half of the inner diameter of the same, range from 0.7×t to 1.5×t, where a value for t is determined by equation (1).

$$t \approx Od \times (\pi/(2 \times (P+\pi))) \tag{1}$$

It is more preferable that the thickness of permanent magnet 8 in its radial direction range from 0.8×t to 1.3×t, where the value for t is determined by equation (1).

It is further preferable that when the thickness of permanent magnet 8 in its radial direction is denoted by t, equation (1) be satisfied.

It is preferable that the number of magnetic poles P be an even number between 4 and 36.

It is more preferable that the number of magnetic poles P be an even number between 8 and 26.

It is further preferable that the number of magnetic poles P be an even number between 10 and 24.

Rotor yoke 7 may contain at least a resin material.

Rotor yoke 7 may contain at least iron (Fe) and silicon (Si).

Permanent magnet 8 may have a surface layer serving as a rust preventive layer.

A conductor of stator winding 5 may contain copper (Cu) or aluminum (Al) and a plurality of types of inevitable impurities.

It is preferable that the size of the gap between rotor 19 and stator 10 in the radial direction range from 0.1 mm to 2 mm.

It is preferable that motor element 3 include motor element armor 18 housing motor element 3 therein and that motor element armor 18 contain at least one of iron (Fe), magnesium (Mg), aluminum (Al), copper (Cu), and a resin material.

It is preferable that stator core 4 contain at least iron (Fe) and silicon (Si).

At least one of the pair of bearings 14 may have seal 30 that is in contact with the outer and inner rings of one of the pair of bearings 14 or have seal 30 that is in contact with the outer ring but not in contact with the inner ring and that is close to the inner ring via a gap.

It is preferable that when the outer diameter of permanent magnet 8 is Od and the thickness of permanent magnet 8 in its radial direction is t, the thickness being given by subtracting a half of the outer diameter of permanent magnet 8 from a half of the inner diameter of the same, equation (2) be satisfied.

$$t \approx Od \times (\pi/(2 \times P)) \quad (2)$$

INDUSTRIAL APPLICABILITY

The flying device according to the present invention is of a closed structure and is light in weight, and therefore can be provided as a flying device with high reliability.

REFERENCE MARKS IN THE DRAWINGS 1 flying device
2 rotary vane
3 motor element
4 stator core
5 stator winding
6 shaft
7 rotor yoke
8 permanent magnet
9 arrow
10 stator
11 tooth
12 tooth
13 teeth
14 bearing
15 drive circuit
16 drive element
17 control element
18 motor element armor
19 rotor
20 yoke
21 controller
22 line
24 magnetic pole detecting element
25 power connector
26 DC power supply
30 seal

The invention claimed is:

1. A flying device comprising:
a plurality of rotary vanes;
a motor element serving as a driving source for each of the plurality of rotary vanes, the motor element driving and rotating a main shaft of the rotary vanes; and
a drive circuit, wherein
the motor element includes:
a stator;
a rotor; and
a pair of bearings, wherein
the stator includes:
a stator core having an annular yoke and a plurality of teeth projecting inward from an interior of the annular yoke; and
stator windings wound respectively around the plurality of teeth of the stator core, wherein the rotor includes:
a permanent magnet of a cylindrical shape located inside the stator core via a gap, the permanent magnet being positioned counter to the plurality of teeth;
a rotor yoke in contact with a cylindrical inner wall surface of the permanent magnet; and
a shaft pivotally supported at an axis of the rotor yoke, the shaft being connected to the main shaft, wherein
the pair of bearings support the shaft to allow the shaft to rotate freely, and are located respectively on both sides of a direction of a rotating shaft of the rotor, wherein
the permanent magnet has anisotropically arranged magnetic poles, and a number of magnetic poles is P representing an even number, wherein
the permanent magnet has a configuration in which the rotor yoke is smaller in weight than the permanent magnet, and wherein
the drive circuit controls a stator current supplied to the stator windings.

2. The flying device according to claim 1, wherein
a ferromagnetic material included in the permanent magnet contains iron (Fe), boron (B), and at least one of scandium (Sc), yttrium (Y), and a lanthanoids-based element.

3. The flying device according to claim 1, wherein
the permanent magnet includes a ferromagnetic material with a density not lower than 7.4 g/cm$^3$.

4. The flying device according to claim 1, wherein
when an outer diameter of the permanent magnet is Od and a thickness of the permanent magnet in a radial direction is t, the thickness being given by subtracting a half of the outer diameter of the permanent magnet from a half of an inner diameter of the permanent magnet, equation (1): $t \approx Od \times (\pi/(2 \times (P+\pi)))$ is satisfied.

5. The flying device according to claim 1, wherein
when an outer diameter of the permanent magnet is Od, a thickness of the permanent magnet in a radial direction, the thickness being given by subtracting a half of the outer diameter of the permanent magnet from a half of an inner diameter of the permanent magnet, ranges from 0.8×t to 1.3×t, where a value for t is determined by equation (1): $t \approx Od \times (\pi/(2 \times (P+\pi)))$.

6. The flying device according to claim 1, wherein
when an outer diameter of the permanent magnet is Od, a thickness of the permanent magnet in a radial direction, the thickness being given by subtracting a half of the outer diameter of the permanent magnet from a half of an inner diameter of the permanent magnet, ranges from 0.7×t to 1.5×t, where a value for t is determined by equation (1): $t \approx Od \times (\pi/(2 \times (P+\pi)))$.

7. The flying device according to claim 1, wherein
the number of magnetic poles P is an even number between 10 and 24.

8. The flying device according to claim 1, wherein
the number of magnetic poles P is an even number between 8 and 26.

9. The flying device according to claim 1, wherein
the number of magnetic poles P is an even number between 4 and 36.

10. The flying device according to claim 1, wherein
the rotor yoke contains at least a resin material.

11. The flying device according to claim 1, wherein
the rotor yoke contains at least iron (Fe) and silicon (Si).

12. The flying device according to claim 1, wherein
the permanent magnet has a surface layer serving as a rust preventive layer.

13. The flying device according to claim 1, wherein
a conductor of each of the stator windings contains copper (Cu) or aluminum (Al) and a plurality of types of inevitable impurities.

14. The flying device according to claim 1, wherein
a size of a gap between the rotor and the stator in a radial direction ranges from 0.1 mm to 2 mm.

15. The flying device according to claim 1, further comprising a motor element armor housing the motor element, wherein
the motor element armor contains at least one of iron (Fe), magnesium (Mg), aluminum (Al), copper (Cu), and a resin material.

16. The flying device according to claim 1, wherein
the stator core contains at least iron (Fe) and silicon (Si).

17. The flying device according to claim 1, wherein
at least one of the plurality of bearings has a seal that is in contact with an outer ring and an inner ring of one of the bearings or has a seal that is in contact with the outer ring but not in contact with the inner ring and that is close to the inner ring via a gap.

18. The flying device according to claim 1, wherein
when an outer diameter of the permanent magnet is Od and a thickness of the permanent magnet in a radial direction is t, the thickness being given by subtracting a half of the outer diameter of the permanent magnet from a half of an inner diameter of the permanent magnet, equation (2): $t \approx Od \times (\pi/(2 \times P))$ is satisfied.

* * * * *